E. A. SPERRY.
SHIP'S GYROSCOPIC COMPASS SET.
APPLICATION FILED SEPT. 25, 1909.

1,242,065.

Patented Oct. 2, 1917.
4 SHEETS—SHEET 1.

WITNESSES:   INVENTOR
Elmer A. Sperry

E. A. SPERRY.
SHIP'S GYROSCOPIC COMPASS SET.
APPLICATION FILED SEPT. 25, 1909.

1,242,065.

Patented Oct. 2, 1917.
4 SHEETS—SHEET 2.

E. A. SPERRY.
SHIP'S GYROSCOPIC COMPASS SET.
APPLICATION FILED SEPT. 25, 1909.

1,242,065.

Patented Oct. 2, 1917.
4 SHEETS—SHEET 3.

WITNESSES

INVENTOR

UNITED STATES PATENT OFFICE.

ELMER A. SPERRY, OF BROOKLYN, NEW YORK, ASSIGNOR TO SPERRY GYROSCOPE CO., OF BROOKLYN, NEW YORK, A CORPORATION OF NEW YORK.

SHIP'S GYROSCOPIC-COMPASS SET.

1,242,065.     Specification of Letters Patent.     Patented Oct. 2, 1917.

Application filed September 25, 1909. Serial No. 519,533.

*To all whom it may concern:*

Be it known that I, ELMER A. SPERRY, a citizen of the United States, residing at Brooklyn, in the county of Kings and State of New York, have invented new and useful Improvements in Ships' Gyroscopic-Compass Sets, of which the following is a specification.

My invention relates to apparatus employed in lieu of compasses, especially for purposes of navigation, and it consists in various details of construction, methods of indicating direction in various parts of a ship upon which the apparatus may be mounted, and also apparatus for recording the indications or directions, and the invention also involves the application of certain principles which it has been found best to employ with regard to the relation between the ship and the apparatus, and comprises means for properly positioning the apparatus on shipboard with reference to the centers of gravity and oscillation, both laterally and longitudinally.

On steel ships, such, for instance, as men-of-war, submarines, etc., it is desirable to employ, as means of indicating direction, apparatus not subject to magnetic disturbances nor magnetic shielding effect of the masses and walls of the ship, including the armor plate and the ship's machinery, especially when the apparatus is placed below the water line in an attempt to increase its security. In this case especially it is necessary that the device should transmit its indications to a number of different points on shipboard and also that the movements of the ship should be recorded. Furthermore, the apparatus should be guarded against shocks and vibrations in so far as possible, and also be preserved against the ballistic effect of acceleration and retardation pressures however produced, as by oscillations when they are applied at some considerable distance from the center about which the oscillation occurs. Unlike the magnetic compass the gyroscopic compass is peculiarly susceptible to those influences responding to them through the gyroscope reactions, to throw the indication away from the true north; the organization, as a whole, to be successful should therefore provide means adapted to these peculiar needs and for overcoming them and also adjusted to shield the compass when used upon a moving or movable support, such as a ship. The following specification describes one form or one embodiment of means whereby these objects may be attained.

Fig. 11 shows a detail of the permanent circuits or connections of one of the indicators.

Fig. 12 is a diagrammatic view of a side elevation of the ship showing the relative position of the apparatus and the axis of some of the ship's motions.

The apparatus of the first four figures may be located within the binnacle, or other suitable support, or it may be located in the hold of the boat or between decks and is preferably so located with reference to the axis of roll and pitch, so that these motions have the minimum effect, or practically no effect, upon the pendulous mass of the gyroscope.

The gyroscope "rotor" or spinning mass, constituting the controlling factor which operates through the well-known gyroscopic principles to establish and maintain a true meridianal direction, is spun preferably by an electric current which may be either direct or alternating, the latter preferred. This may consist of either three two or single phase current—the latter being preferred in some applications for reasons which will presently become apparent.

Some of the other electrical arrangements of the compass are actuated by electric currents other than those above described, that is, currents having different characteristics, such, for instance, as different electrical potentials, or by direct current as distinguished from alternating current. And it is my plan to supply these currents from a unitary or common energy supply, or they may be developed by a common mechanical source such, for instance, as generator 15 Fig. 5, which may consist of a D. C. generator and an A. C. generator driven from the same power source, or these two may be a unit, more or less integral and A. C. leads, terminating in the usual slip rings, shown at right, may be employed, the commutator of the D. C. generator being shown at the left. As to the detail of this common or unitary source of energization for operating the navigation system, it should be pointed out that I have planned my system to be self-contained and the various kinds of electric current required for the operation are supplied from the same energy source by either supplying the motor or rotary factor, or factors, of the mechanical or other source or sources of supply, or by any of the various transformers required to convert the ship's electrical supply into the various forms or kinds of electric current required to operate the various factors going to make up my complete gyro navigation equipment, and for securing results which are not only important but believed to be entirely unique as herein set forth.

Figure 9:
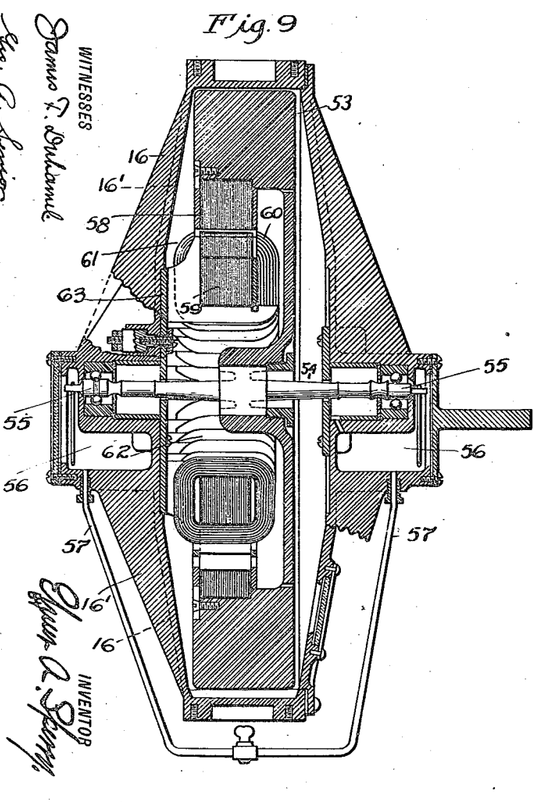
Fig. 9 shows a section of the fly wheel of the gyroscopic compass—also inclosing casing and motor.
Figure 10:
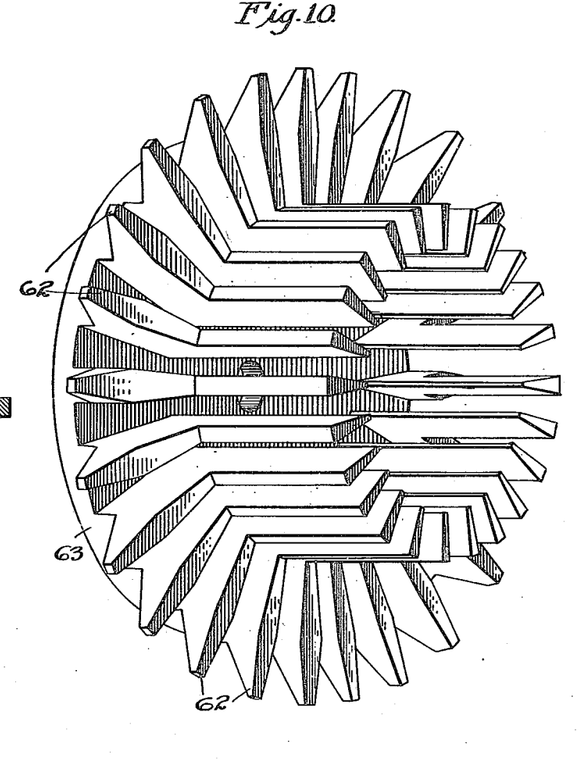
Fig. 10 shows a detail of the construction shown in Fig. 9.

The "rotor" of the gyroscope is contained in the inclosure or casing 16, preferably sealed or practically so, and supplied with heat radiating means such as ribs 16'. The rotor is provided with a heavy overhanging rim (58) and a hollowed out center into which fits the stator (59). Said stator is made as shown in Fig. 10, with fingers (62) to aid in dissipating the heat from the stator windings 60. The rotor shaft (55) is supported in ball bearings which are lubricated from oil wells (56) by means of oil rings. 57 is a tube to equalize the oil in the wells. The specific features of the gyro-rotor shown in Figs. 9 and 10 are not claimed herein, but are reserved for my co-pending application #634594—gyroscopic apparatus, filed June 21, 1911. The casing 16 is suspended from above and constitutes a pendulous mass which is suitably and adjustably supported at a point above its center of gravity as by the float 17, preferably of sheet or wrought iron or steel, partially submerged in mercury or other liquid within the tank 18, which in turn supports the brass or other rim 19' holding the glass 19 immediately over the compass card 25.

The Cardan ring 20 supports the structure by a suitable pivot such as knife edges 20'—the ring in turn being supported to the normal by knife edges 21, from the ship or part thereof. I prefer, however, the intermediary of an inertia factor represented in the one form by the weight 21' upon which knife edges 21 bear, the weight being fulcrumed upon a suitable support at point 22, and supported by spring 23 by means of the upright rods 22' and adjustable stops 22" secured to said weight 21'. It should be noted that the trajectory of these stops in turning about 22 indicated by a dotted line, may make an angle with the horizontal which is so selected that it approaches coincidence with the inclination of the spring curve at its working position. This arrangement imparts to the general scheme the important quality of being suspended upon a spring of nearly infinite length, giving to the supporting mass an exceedingly long natural period of oscillation, which is moreover adjustable, and by this means may be so arranged that it is not likely to phase with any of the ordinary vibrations or motions reaching the apparatus. The instrument is guarded against augmentation of movement or vibration by this arrangement. The inertia factor of the weight also guards the instrument by virtue of the fact that the weight is preferably greater or in effect greater than that of any single factor in the suspended parts. The fact that the weight, or a portion thereof, is farther from the fulcrum than are the knife edges 21 gives it an added advantage of functioning without unduly increasing the masses.

Bent lever 23' pivoted at 23" to a stationary support carries at the end of one of its arms a hanger or stirrup 23ᵃ for supporting the spring 23. A bolt 23ᵇ secured to a stationary support is threaded to engage the other arm of the lever, suitable adjusting nuts 23ᶜ being provided to vary the angular position of the bent lever and thereby to adjust the position and resistance of spring 23.

Figure 1:
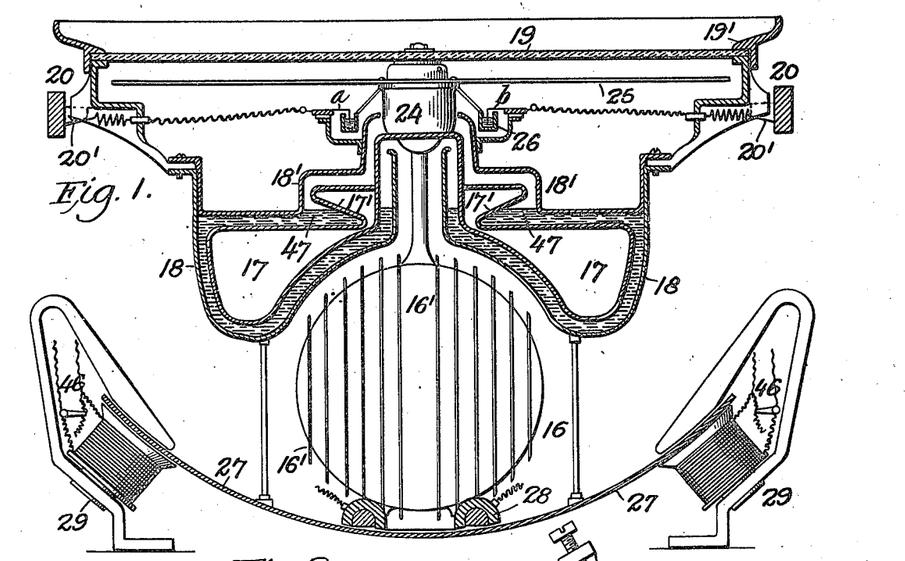
Figure 1 is a vertical section of one form of gyroscopic compass, showing also the transmitter.
Figures 2, 3, 4:
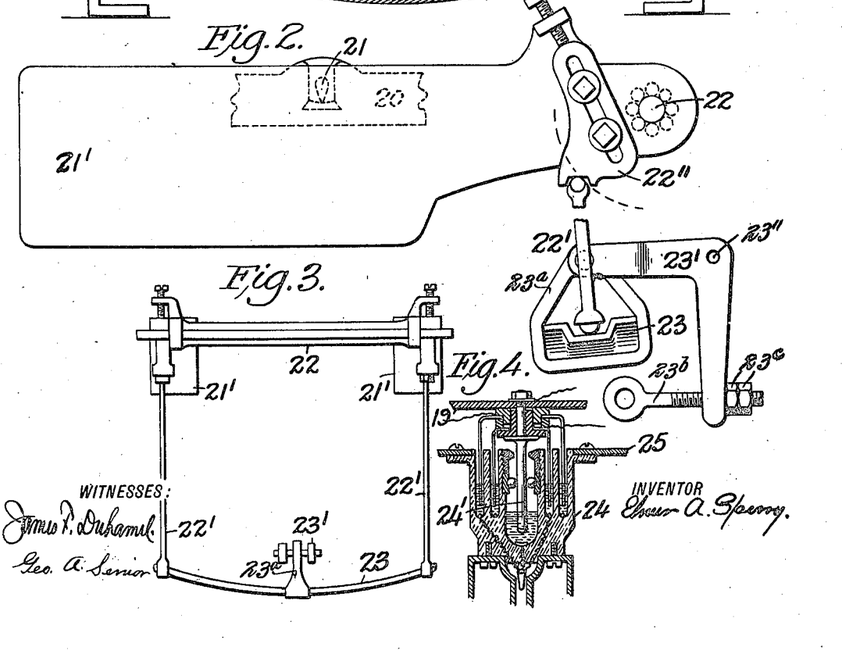
Fig. 2 is the supporting inertia weight and spring in side elevation, also the adjusting means for the spring.
Fig. 3 is a sketch in elevation of the same part at right angles to Fig. 2.
Fig. 4 is a detail of the compass card carrier and insulated mercury cups for establishing electric circuits.

The pendulous mass, supported from above as by the float 17, is free for limited vertical motion and is guided by the little central stem 24' which may also be supplied with the ball-bearings shown in Fig. 4. This detail also shows how the stem is held and at the same time insulated by the compass glass 19, the stem also serving to sustain other insulated bells or conductors, each of which makes suitable electrical connections between the relatively stationary parts 18 and 20 and the more sensitive central orienting portion which moves with the gyro. It may be noticed that switches, or circuit manipulating devices, for the proper control of some of these circuits are to be seen both interior to the machine and exterior thereto in Fig. 5. Each bell or conductor dips into a separate concentric mercury cup fixed in the central block of insulation 24, which serves at the same time to hold the compass card 25, and also the transmitter trough 26 (see Figs. 1, 5, 6, 7 and 8), into which the contacts $a$ and $b$ and $a'$ and $b'$ dip and which also is supplied with the energizing leads $x$ and $v$ which move in azimuth with said trough and compass card (Figs. 5 and 6).

Where a float is employed a tank cover is provided as shown at 18'. Carried by a suitable part, such, for instance, as the tank 18 itself, is the damper plate 27, consisting of a spherical plate of sheet copper, aluminum or the like, located in more or less close proximity to a damping magnet 28 attached for example to the lower part of casing 16. The current to this magnet is controlled and adjusted by a switch 28'. (Fig. 5). This damper specifically resists radial motions of the gyro and its casing but does not in this instance oppose rotation. To this end the annular form has been adopted, as is clearly seen in the figures. An extension of this disk or plate 27 serves to coöperate with the damping magnets 29 to damp the pendulous action or swinging upon its Cardan mounting. The magnets are secured to a solid part, or otherwise suitably mounted and energized—the magnetic intensity being controlled and adjusted, as plainly indicated.

Figures 5, 6:
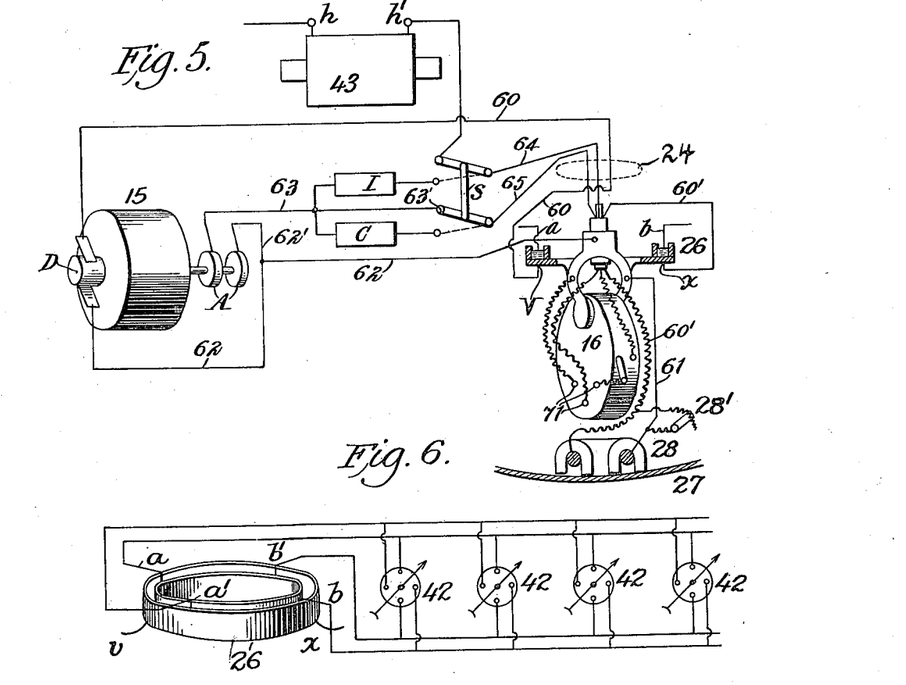
Figs. 5 and 6 are diagrams of electric circuits of the apparatus and system, including the indicators or repeating compasses.

Fig. 5 illustrates more or less diagrammatically the wiring system by which the various parts of the apparatus are energized. 15 represents a motor generator provided with a commutator D, and also with slip-rings A. From the commutator D, the direct current lead 60 passes to the mercury cup 24, entering the circuit resistance box or mercury trough 26 at point V through a suitable flexible connection. Current entering at V divides and passes around trough 26 in opposite directions, uniting again at X, whence it flows through lead 60' which passes downwardly as shown and is flexibly connected to a magnet 28, from which current is led to ground by wire 61, the ground being connected with float 17. Through the float, the current within passes through the mercury to basin 18 which is the virtual point of attachment of return lead 62 which passes back to the commutator D. The current passing through magnet 28 may be shunted to a variable extent through an adjustable switch or rheostat 28'. The lead 62 is a common return wire for both alternating and direct current, being connected as shown by lead 62' to one of the slip-rings A. The other slip-ring is provided with a lead 63 having three branches in parallel leading, respectively, to inductance I, switch point 63', and capacity C.

In starting, switch S is in the position shown in dotted lines, wires 64 and 65 being thus energized with a lagging current and a leading current, respectively, which in conjunction with the current in wire 62 gives the effect of a 3-phase current for the three terminals 71 which are suitably connected to the stator coils driving the gyro wheel or rotor within the wheel casing 16. In this way a single-phase current is given the effect of a 3-phase current during the starting period. It is well known that a 3-phase motor after being brought up to speed will run practically as well with a single-phase as with a 3-phase current. Consequently the switch S may be moved into the position shown in full lines after the gyro wheel has been brought up to speed, the lower switch arm then making contact with switch point 63' and being connected directly through wire 63 to one of the slip-rings A, while the upper arm of the switch is connected to terminal H' of the high tension generator 43. The inductance and capacity are obviously cut out when the switch is moved into this latter position.

It may be noted that leads 60, 64 and 65 enter the compass mechanism above the mercury cup 24, while the ground and counter return wire 62 does not pass through the mercury cup at all but through the grounded float 17. The damping coil 28 and the transmitter device 26 may be energized through the same concentric mercury cup in the part 24, a series circuit arrangement being shown.

Figures 7, 7A:
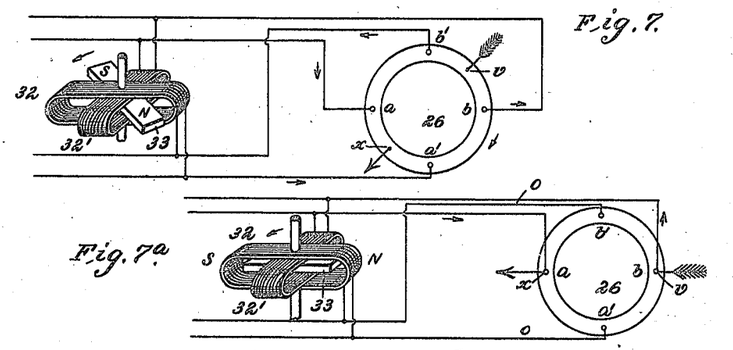
Figs. 7, 7ª, 8 and 8ª show the circuit relations between the transmitters and repeaters.
Figures 8, 8A, 11, 12:
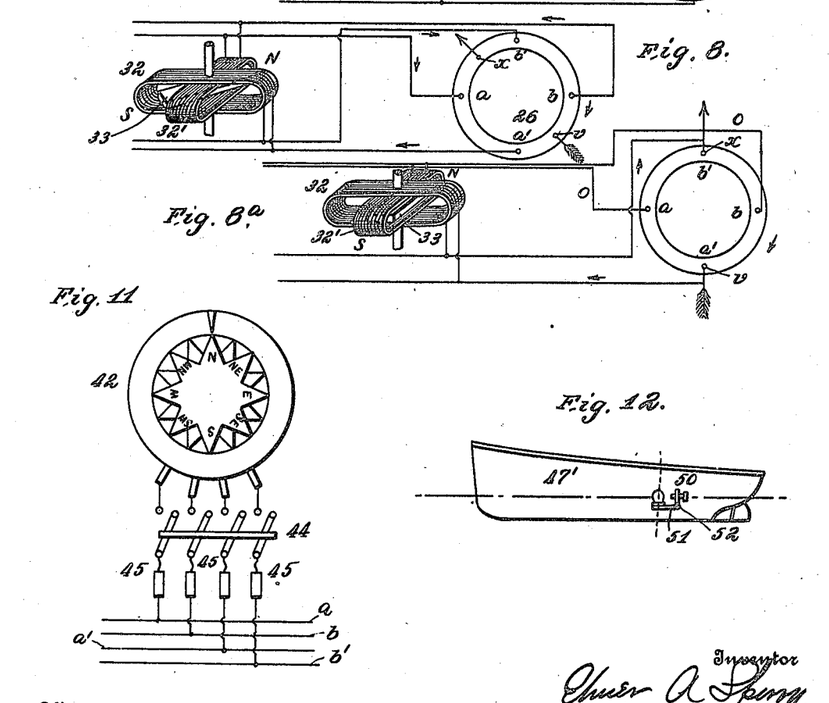

To obtain the indication of the instrument at different positions in the ship, the transmitter resistance in this instance illustrated as a mercury trough 26 is provided, as before noted with two pairs of oppositely located stationary contacts $a$ and $b$ and $a'$ and $b'$ at right angles to each other. (Figs. 6, 7 and 8). These contacts form terminals of the two stationary coils 32 and 32' of the indicators 42. (Figs. 7 and 8). These two coils are positioned at right angles to each other, and the movable magnetic armature 33 exhibits the combined and coöperating positive and negative energization of these two coils through the entire 360 degrees of arc.

The method of transmitting readings from the master compass to the repeater instruments will be clear from the foregoing especially when taken in connection with Figs. 7, 7ª, 8 and 8ª. It is to be recalled that conductor 60, carrying the direct current of measurable volume, enters the circuit mercury resistance trough or transmitter 26 at V, the current dividing at this point and reuniting at X whence it passes out on wire 60'. The points V—X are fixed relative to the mercury trough and therefore move with this trough which orientates. The terminals a—b and a'—b' of the repeater coils remain stationary however, during the orientation, with the result that the position of the points V—X relative to a—b and a'—b' alters with the orientation. This results in instituting different potential relations for the different relative positions noted, thus setting up currents in different conditions and amounts through the coils 32 and 32' of each repeater instrument. When only one of these coils is energized, the magnet 33 takes up a position exactly at right angles thereto; and when both coils are energized, the magnet sets itself at an angle of 45° to both coils; and as the energization fades in one coil and increases in the other, the magnet passes to intermediate positions. In Fig. 7, point V being midway between b and b', and the point X being midway between a and a', the coil circuits 32 and 33 are equally energized, and the magnet 33 stands in its 45° position or midway between the two coils. In Fig. 7ª the trough 26 has turned through 45° and the terminals a—b receive full difference in potential, while there is no difference in potential between terminals a' and b' since they are both equidistant from V and X. Consequently a maximum current passes through coil 32', while no current passes through coil 32; and the magnet 33 therefore stands at right angles to coil 32'.

In Fig. 8 another 45° turn has been made by the trough 26 and the coils receive the same amount of current as in Fig. 7. The potential relation of terminals a'—b' has, however, been reversed, while that of terminals a—b remains the same as before. As a result, the armature 33 has made a 45° turn counter clockwise and stands in a midway position. In Fig. 8ª the trough has made still another turn of 45°.

The terminals a'—b' are subjected full difference of potential and coil 32 receives a maximum current; while between terminals a—b there is no difference of potential and coil 32' has no magnetizing effect. Consequently the magnet lies at right angles to coil 32 and is seen to have turned counter clockwise through another interval of 45°. A further turn of the transmitter trough 26 through 45° would bring the parts into a position similar to that shown in Fig. 7 but with the arrow V—X reversed. Similarly the magnetized armature 33 would be in a position parallel to that shown in Fig. 7 but with its ends N—S turned around.

By tracing the course of the resistance trough 26 through the remaining 180° of arc, either continuing in the same direction from the position shown in Fig. 8ª or starting from the position shown in Fig. 7 and going in the opposite direction, a similar set of changes in the position of armature 33 could be shown. The principle of these changes is, however, sufficiently clear from what has been said above, and it seems unnecessary therefore to trace the operation through these remaining positions. It is evident that for any position of the azimuth indicating element of the master gyro compass, there is a corresponding position of the orientating energizing terminals V and X relative to the fixed magnet coil terminals a—b and a'—b' dipping into the mercury resistance trough; and that this determines a corresponding position of the magnet or armature 33. From this it is clear that the master compass indications can be reproduced in one or more repeaters with great accuracy.

A recorder is also operated on the same circuits as the indicator. This need not be gone into in detail at this time.

When a change of either heading speed or acceleration or retardation pressures are introduced in any manner a series of oscillations about the true meridian tends to be set up in the gyrostat constituting a "hunting" action, and the instrument during this period as to specific reading lacks an accuracy to the extent of the amplitude of the vibrations constituting the "hunting" action, the mean reading being, of course, accurate. These, of course, should be suppressed to make the instrument "dead beat" and accurate in its specific indications at all times. It is a characteristic of the gyroscopic action, however, that each oscillation about the vertical axis is accompanied by a tendency to swing sidewise owing to the phenomenon of precession, or vice versa, the one always being the effect of the other, in which ever order they occur. I have discovered if these lateral swings can be properly utilized or opposed, the "hunting" action can be very largely overcome, but the free rotation about the vertical axis should not in the last analysis be opposed, though when this rotation is considered as precession, it may be the element to receive direct treatment or it may be secondary as indicated; either motion may be considered as being precession resulting from motions or impressed forces or impressed forces in the other plane. The annular magnet 28 illustrates one means which allows of a very complete fulfilment of this peculiar requirement, the magnet coöperating with the damping plate 27; rotation not altering the number or position of the lines passing through the plate, but even a small lateral swing alters their position and through the Foucault currents, which are thus generated in the mass of the disk, a reaction is set up between the disk and the magnet which effectually opposes the primary motions and dampens such motions directly in their inception.

The inertia weights 21' and the elastic and yielding support coöperate with the float 17 and the gyroscope to prevent dancing of the floating mass, and thus permits a much closer adjustment between the magnet 28 and the disk 27. The damping magnet 29, coöperating with this same disk, damps movement of the Cardan mounting—this magnet being adjusted by the switch arm 46.

The level of the mercury or other liquid used to support the float 17 surrounding the overhanging emergent portion of stabilizing cone or surface 17', is indicated at 47, and is altered as one means of altering the relations of the centers of gravity of the elements or their oscillating centers. Any tendency to shift out of the vertical changes the center of buoyancy so as to immediately introduce quite a powerful righting moment which very greatly aids in preventing oscillations and helps to prevent hunting and also prevents inaccurate indications on the part of the instrument due to various causes, such for instance, as acceleration pressures.

Referring now to Fig. 12 attention should be called to the fact that the apparatus as a whole indicated at 50 at or near the axis of the ship's oscillations, as stated, may be adjustably mounted as by the bell-crank lever 51 fulcrumed at 52. The horizontal dotted line 47 indicates the axis of lateral oscillation or roll, and the vertical dotted line may indicate the mean axis through slight angles of swing or changes in heading of the boat. The relation of the apparatus 50 to these axes is such that oscillations on the part of the ship are enabled to impart to the apparatus itself the minimum of acceleration and retardation processes due to actual motion or "slinging" as contradistinguished from angular motion. It will be noticed that many parts are shown herein and in certain definite relations. Some of these elements may be omitted and others operatively introduced, or the relation of the parts may be altered, and the invention extends to such use.

Having described the invention and indicated the use and operation of the various parts in connection with such description, I claim as my invention:

1. In gyro navigation apparatus, a gyro wheel including an electrically driven part, a float for supporting the gyro in stable equilibrium, a central guiding member independent of said float for confining the motion of the gyro and float, a mercury cup into which the guiding member dips, electric circuits for the apparatus including said guiding member and an insulating support for said guiding member.

2. In gyro navigation apparatus an electrically operated gyro wheel including an electrically driven part, a float for supporting the gyro in stable equilibrium, a central guiding member independent of said float for confining the motion of the gyro and float, a mercury cup into which the guiding member dips, electric circuits for the apparatus including such guiding member and the float and an insulating support for such guiding member.

3. In gyro navigation apparatus, a gyro wheel including an electrically driven part, a float for supporting the gyro in stable equilibrium, a central guiding member independent of said float for confining the motion of the gyro and float, a mercury cup into which the guiding member dips, electric circuits for the apparatus including such guiding member, an insulating support for such guiding member, and an electric connection from the said mercury cup to said electrically driven part for the gyro wheel.

4. In gyro navigation apparatus, a gyro wheel, a float supporting the wheel in stable equilibrium, and a liquid supporting said float, the emerging line or perimeter of the float being materially less in diameter than the outer diameter of the main submerged portion of such float, in combination with means containing said liquid and adapted to be mounted on a ship.

5. In gyro navigation apparatus, a gyro wheel, a Cardan support, a pendulous support for the wheel located inside and carried by the Cardan support and allowing universal pivotal motion, a device comprising a part independent of such pendulous support for opposing motions about one axis on the part of the gyro wheel, but leaving it comparatively free for motion about a different axis.

6. In gyro navigation apparatus, a gyro wheel, a Cardan support, a pendulous support for the wheel inside and carried by the Cardan support and allowing universal pivotal motion, a device comprising a part independent of such pendulous support for opposing motion about a horizontal axis on the part of the gyro wheel but leaving it comparatively free for motion about a vertical axis.

7. In gyro navigation apparatus, a gyro wheel, a float for supporting the gyro wheel, a Cardan mounting for said float and wheel, a supporting medium for said float, a central guiding member for confining the motion of the gyro and float, the portion of such float which emerges from the surface of the medium supporting the float flaring upwardly and outwardly whereby a righting moment is secured as between the gyro wheel and the Cardan supported parts of the apparatus.

8. Apparatus of the character described comprising the combination, with a unidirectional persisting device, of a Cardan support for the device and means arranged to damp undesirable oscillations of the supported parts without interfering with relative movements in azimuth between said parts and the Cardan support.

9. Apparatus of the character described comprising the combination, with a unidirectional persisting device, a Cardan support for the device and adjustable means arranged to damp undesirable oscillations of the supported parts without interfering with relative movements in azimuth between said parts and the Cardan support.

10. Apparatus of the character described comprising the combination, with a unidirectional persisting device, a Cardan support for the device and electromagnet means arranged to damp undesirable oscillations of the supported parts without interfering with relative movements in azimuth between said parts and the Cardan support.

11. In a gyroscopic compass, a Cardan support, a uni-directional persisting device, consisting in part of a gyro wheel pendulously hung below Cardan's point within such support, a suitable foundation or mounting for the apparatus and a spring-supported part provided with a predetermined inertia relative to the weight of the compass located between the foundation and the Cardan support.

12. In a gyroscopic compass, a Cardan support, a uni-directional persisting device, consisting in part of a gyro wheel pendulously hung below Cardan's point within such support, a suitable foundation or mounting for the apparatus, a spring-supported part provided with a predetermined inertia relative to the weight of the compass located between the foundation and the Cardan support and a pivot upon such part for carrying the said Cardan support.

13. In a gyroscopic compass, a Cardan support, a uni-directional persisting device, consisting in part of a gyro wheel pendulously hung below Cardan's point within such support, a suitable foundation or mounting for the apparatus, and a spring-supported part provided with a predetermined inertia relative to the weight of the compass located between the foundation and the Cardan support, the gyro wheel being free and the said Cardan support being restrained as to its movements.

14. In a gyroscopic compass, a Cardan support, a uni-directional persisting device, consisting in part of a gyro wheel pendulously hung below Cardan's point within and from such support, a suitable foundation or mounting for the apparatus and a spring-supported part provided with a predetermined inertia relative to the weight of the compass located between the foundation and the Cardan support, the gyro wheel being free and the said support being restrained as to movements each way from a normal central point.

15. In apparatus for performing the function of the compass, a base, a uni-directional persisting device, a Cardan support for the device, and a spring supported inertia part suitably pivoted and located between the base and the Cardan support, the connection with the spring operating with a radius adapted to be varied with changes of position of the part for the purposes set forth.

16. In apparatus for performing the function of the compass, a base, a uni-directional persisting mechanism, a Cardan support for the mechanism, and a spring supported inertia part suitably pivoted and located between the base and the Cardan support, the connection with the spring operating with a radius adapted to be varied with changes of position of the part for the purposes set forth—the point of application being adjustable with reference to the inertia part.

17. In apparatus for performing the function of the compass, a uni-directional persisting device, a Cardan support for the device, and a spring pivoted supported inertia part located between the foundation and the Cardan support, the moment of inertia of said inertia part being in effect greater than the moment of inertia of said device.

18. In apparatus for performing the function of the compass, an electrically operated gyrostat, a float for supporting such gyrostat in stable equilibrium, a combined central guiding member and electric conductor in combination with ball-bearings surrounding the guiding member and electrical insulation between the support and the remaining portion of the apparatus.

19. In apparatus for performing the function of the compass, an electrically operated gyrostat, a float for supporting such gyrostat in stable equilibrium, a combined central guiding member and electrical conductor in combination with ball-bearings surrounding the guide, and a cylindrical surface provided upon the guide within the ball-bearings for allowing of free vertical movement of the float.

20. In gyro navigational apparatus, a gyro wheel, a Cardan support, a pendulously mounted support for the wheel carried by the Cardan support and allowing universal motion, a device secured to said Cardan support, means coöperating therewith mounted on said pendulous support for opposing radial movement of said support, and independently mounted means coöperating with said device for opposing movement of the Cardan support.

21. In apparatus of the character described, the combination, with an electrically operated gyrostat, of a liquid container and a buoyant member arranged to support said gyrostat by flotation in the liquid, the upper or emergent portion of said buoyant member having an inverted conical form.

22. In a gyroscopic compass plant, a direction indicating element, a gyroscopic wheel associated therewith, alternating current means operating the gyroscopic wheel, an electrical transmitting device connected with said direction indicating element, a repeater operated from said device, a source of alternating electric current for said gyro operating means, and also a source of direct current supply for said transmitting device and repeater, circuit connections between such supply sources, means, repeater, and device within the compass, including a flexible connection at the compass forming a part of such circuit connections.

23. A gyroscopic compass plant comprising a gyro wheel, alternating current means operating the gyro wheel, an electrical device other than said means connected with a direction-seeking moving element of the compass, two sources of electrical supply of different electrical characteristics, circuit connections between each source and the compass and a flexible connection at the compass forming a part of such circuit connections, the device being in circuit with one of such sources through the said flexible connection.

24. A gyroscopic compass plant comprising a gyro wheel, alternating current means operating the gyro wheel, an electrical device other than said means connected with a direction-seeking moving element of the compass, two sources of electrical supply of different electrical characteristics, circuit connections between each source and the compass, and a flexible connection at the compass forming a connection common to each of the said sources.

25. A gyroscopic compass plant comprising a gyro wheel, alternating current means operating the gyro wheel, an electrical device other than said means connected with a direction-seeking moving element of the compass, two sources of electrical supply of different electrical characteristics, circuit connections between each source and the compass, a flexible connection at the compass forming a connection common to each of the said sources, and a switch for dissimultaneously coupling the said sources with the flexible connection such as described.

26. A gyroscopic compass plant comprising a gyro wheel, alternating current means operating the gyro wheel, an electrical device other than said means connected with a direction-seeking moving element of the compass, a source of alternating and also of direct electric current supply consisting of a single rotating element, circuit connections between such sources, means and device, and a flexible connection at the compass forming a part of such circuit connections.

27. A gyroscopic compass plant comprising a gyro wheel, alternating current means operating the gyro wheel, an electrical device other than said means connected with a direction-seeking moving element of the compass, a source of alternating and also of direct electric current supply consisting of a single rotating element impelled by a common motor, circuit connections between such sources, means and device, and a flexible connection at the compass forming a part of such circuit connections.

28. A gyroscopic compass equipment comprising a gyro wheel, alternating current means operating the wheel, an electric device other than said means connected with the azimuth moving element of the compass, sources of electric currents of different characteristics, one of which is alternating, circuit connections from the sources to said means and to said device, a flexible connection at the compass forming part of such circuit connections, and a conductor also forming a portion of said circuit connections which is common to the said differing currents.

29. A gyroscopic compass equipment comprising a gyro wheel, alternating current means operating the wheel, an electric device other than said means connected with the azimuth moving element of the compass, sources of electric currents of differing characteristics, one of which is direct, circuit connections from the sources to said means and to said device, a flexible connection at the compass forming a part of such circuit connections, and a conductor also forming a portion of said circuit connections which is common to the said differing currents.

30. A gyroscopic compass equipment comprising a gyro wheel, alternating current means operating the wheel, an electric device other than said means connected with the azimuth moving element of the compass, sources of electric current of differing characteristics, one being of higher electrical potential than the other, circuit connections from the sources, said means and to said device, a flexible connection at the compass forming a part of such circuit, and a conductor also forming a portion of said circuit connections which is common to the said differing currents.

31. The combination, with a ship and a master compass comprising a gyroscopic wheel, and electrical means for driving the wheel, the master compass being located near the axis of oscillation of the ship, of a repeater compass at a distance from said master compass, an electric actuating system arranged to transmit indications from the master compass to the repeater compass, a unitary source of energy supply for said means and said system, and a common conductor within the compass in circuit with the said means and also the electric actuating system.

32. In gyroscopic apparatus of the character described, the combination of a gyro wheel and its journal frame mounted for limited oscillation, an element possessing inertia also mounted for movement relative to that of the wheel frame, means for damping relative movements between the frame and the element, and means for varying the damping effect.

33. In gyroscopic apparatus of the character described, the combination of a gyro wheel and its journal frame mounted for more or less free oscillation, an element possessing inertia also mounted for movement relative to that of the wheel frame and electromagnetic means for damping relative movements between the frame and the element.

34. In an electrically driven gyro equipment the combination, with a master compass comprising a gyro wheel and electric driving means therefor, of a repeater compass, electric circuits connecting the master with the repeater compass, a source of electrical supply, an electric transmitter upon the master compass, and electrical connections extending from said source to both the electric driving means for the compass wheel and the said transmitter comprising a conductor common to both said means and said transmitter.

In testimony whereof I have hereunto set my hand in presence of two subscribing witnesses.

ELMER A. SPERRY.

Witnesses:
BENJAMIN W. LANGSTROTH,
A. R. GIBBS.